United States Patent
Sugiyama

(10) Patent No.: US 11,256,088 B2
(45) Date of Patent: Feb. 22, 2022

(54) VEHICLE DISPLAY DEVICE

(71) Applicant: Yazaki Corporation, Tokyo (JP)

(72) Inventor: Tetsuya Sugiyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/210,483

(22) Filed: Mar. 23, 2021

(65) Prior Publication Data

US 2021/0302727 A1 Sep. 30, 2021

(30) Foreign Application Priority Data

Mar. 27, 2020 (JP) ............................ JP2020-057331

(51) Int. Cl.
| | | |
|---|---|---|
| G09G 5/00 | (2006.01) | |
| G02B 27/00 | (2006.01) | |
| B60K 35/00 | (2006.01) | |
| G02B 27/01 | (2006.01) | |

(52) U.S. Cl.
CPC .......... *G02B 27/0093* (2013.01); *B60K 35/00* (2013.01); *G02B 27/0179* (2013.01); *G02B 2027/0187* (2013.01)

(58) Field of Classification Search
CPC ................ B60K 35/00; G02B 27/0179; G02B 2027/0187
USPC .......................................................... 345/156
See application file for complete search history.

(56) References Cited

U.S. PATENT DOCUMENTS

| | | | | |
|---|---|---|---|---|
| 2009/0237803 A1* | 9/2009 | Hotta | ..................... | G02B 3/005 359/630 |
| 2013/0235200 A1* | 9/2013 | Giesler | ..................... | B60R 1/00 348/148 |
| 2016/0133170 A1* | 5/2016 | Fateh | ..................... | G06F 3/012 345/428 |
| 2019/0137770 A1* | 5/2019 | Huang | ............... | G01C 21/3638 |
| 2019/0351839 A1* | 11/2019 | Tsuruta | ............... | B60R 11/0264 |

FOREIGN PATENT DOCUMENTS

| | | |
|---|---|---|
| JP | 2013-112269 A | 6/2013 |
| JP | 2016-130771 A | 7/2016 |
| JP | 2017-171146 A | 9/2017 |
| JP | 2019-56884 A | 4/2019 |

* cited by examiner

*Primary Examiner* — Jonathan M Blancha
(74) *Attorney, Agent, or Firm* — Kenealy Vaidya LLP

(57) ABSTRACT

A vehicle display device includes a controller that controls an image projection unit on the basis of acquired information regarding a vehicle and information on a face orientation and eye point of a driver acquired from an image analysis unit to perform a display image control for displaying a virtual image at a predetermined position in a virtual image display region. In a case where the acquired information regarding the vehicle is state change information, the controller performs a display image control for a display image displayed by the image projection unit so that a state change virtual image S1 corresponding to the state change information is displayed in the same display form in both of a right monocular viewing region and a left monocular viewing region at the same time.

4 Claims, 8 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2020-057331 filed in Japan on Mar. 27, 2020.

BACKGROUND OF THE INVENTION

1. Field of the Invention

The present invention relates to a vehicle display device.

2. Description of the Related Art

In recent years, a vehicle display device such as a head-up display, which displays a virtual image in front of a vehicle by projecting a display image onto a windshield to allow a driver to view the virtual image, may be mounted on a vehicle such as an automobile. For example, Japanese Patent Application Laid-open No. 2016-130771 proposes a display device in which, when displaying a virtual image that straddles the boundary between a display region that is viewable with only one eye and a display region that is viewable with both eyes, the brightness of the entire display region that is viewable with only one eye is set to be higher than the brightness of the entire display region that is viewable with both eyes to allow a driver to easily view the virtual image.

Japanese Patent Application Laid-open No. 2013-112269 discloses that, in a head-up display having a central display region, a left display region, and a right display region, a small amount of information is displayed in the central display region, and information for complementing the information displayed in the central display region is sorted and displayed in the left display region and the right display region.

Japanese Patent Application Laid-open No. 2017-171146 discloses that a display device capable of displaying two images, one for the left eye and the other for the right eye, is provided, and when a detected viewpoint position of the driver is moved laterally from a reference position, among the two images of the display device, an image on a side to which the viewpoint position is moved is gradually thinned according to the amount of movement from the reference position.

Japanese Patent Application Laid-open No. 2019-56884 discloses a configuration in which in a case of enabling viewing of images superimposed on a surrounding environment in front of a line of sight of an occupant of a vehicle, positions of both eyes and a line-of-sight direction of the occupant are acquired, and a reference line is set in a display region on the basis of an intersection point where a center line passing through a middle point between both eyes of the occupant along the line-of-sight direction intersects with the image display region, and among images displayed in the display region, an image displayed on a side corresponding to the left eye in relation to the reference line is displayed as an image viewed with only the left eye, and an image displayed on a side corresponding to the right eye in relation to the reference line is displayed as an image viewed with only the right eye.

By the way, as in Japanese Patent Application Laid-open No. 2016-130771, even when it is easy for the driver to view the virtual image projected in front of the vehicle, a recognition level of information indicated by the virtual image may be different between a case where the virtual image is displayed in a display region that is viewable with only one eye (hereinafter, referred to as a "monocular viewing region") and a display region that is viewable with both eyes (hereinafter, referred to as a "binocular viewing region"). Therefore, priority is given to a display of the virtual image in the display region that is viewable with both eyes.

SUMMARY OF THE INVENTION

An object of the present invention is to provide a vehicle display device that can efficiently utilize a display region that is viewable with only one eye.

In order to achieve the above mentioned object, a vehicle display device according to one aspect of the present invention includes an image display unit that projects a display image onto a projected member of a vehicle and displays a virtual image corresponding to the display image projected onto the projected member in a virtual image display region in which the virtual image is displayable to allow a driver of the vehicle to view the virtual image; a vehicle information acquisition unit that acquires information regarding the vehicle; and a controller that is configured to cause the image display unit to display a vehicle information virtual image corresponding to the information regarding the vehicle, wherein the virtual image display region includes viewing regions including: a binocular viewing region that is a portion where a right eye viewing region viewable with a right eye of the driver and a left eye viewing region viewable with a left eye of the driver overlap each other, and that is viewable with both eyes of the driver; a right monocular viewing region that is adjacent to a left side of the binocular viewing region and is a portion of the right eye viewing region excluding the left eye viewing region; and a left monocular viewing region that is adjacent to a right side of the binocular viewing region and is a portion of the left eye viewing region excluding the right eye viewing region, the information regarding the vehicle includes state change information indicating a state change in the vehicle, and in a case where the acquired information regarding the vehicle is the state change information, the controller performs a display image control for the display image displayed by the image display unit so that a state change virtual image corresponding to the state change information is displayed in the same display form in both of the left monocular viewing region and the right monocular viewing region at the same time.

According to another aspect of the present invention, in the vehicle display device, it is preferable that the controller changes a display form of the state change virtual image over time.

According to still another aspect of the present invention, in the vehicle display device, it is preferable that the controller performs a display image control for the display image displayed by the image display unit so that a pre-state-change virtual image corresponding to pre-state-change information corresponding to a state before the state change in the vehicle is displayed in the binocular viewing region, the controller hides the pre-state-change virtual image when the state change information is acquired, and the controller performs a display image control for the display image displayed by the image display unit so that the state change virtual image is displayed in a display form that provides a higher viewability when the driver views a virtual image displayed in the right monocular viewing region and the left monocular viewing region with both eyes.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a vehicle display device according to an embodiment of the present invention will be described in detail with reference to the drawings. Note that the present invention is not limited to the embodiment described below. Components in the following embodiment include those that can be easily assumed by those skilled in the art, or those that are substantially the same. In addition, the components in the following embodiment can be omitted, replaced, or changed in various ways without departing from the gist of the invention.

Embodiment

Figure 1:
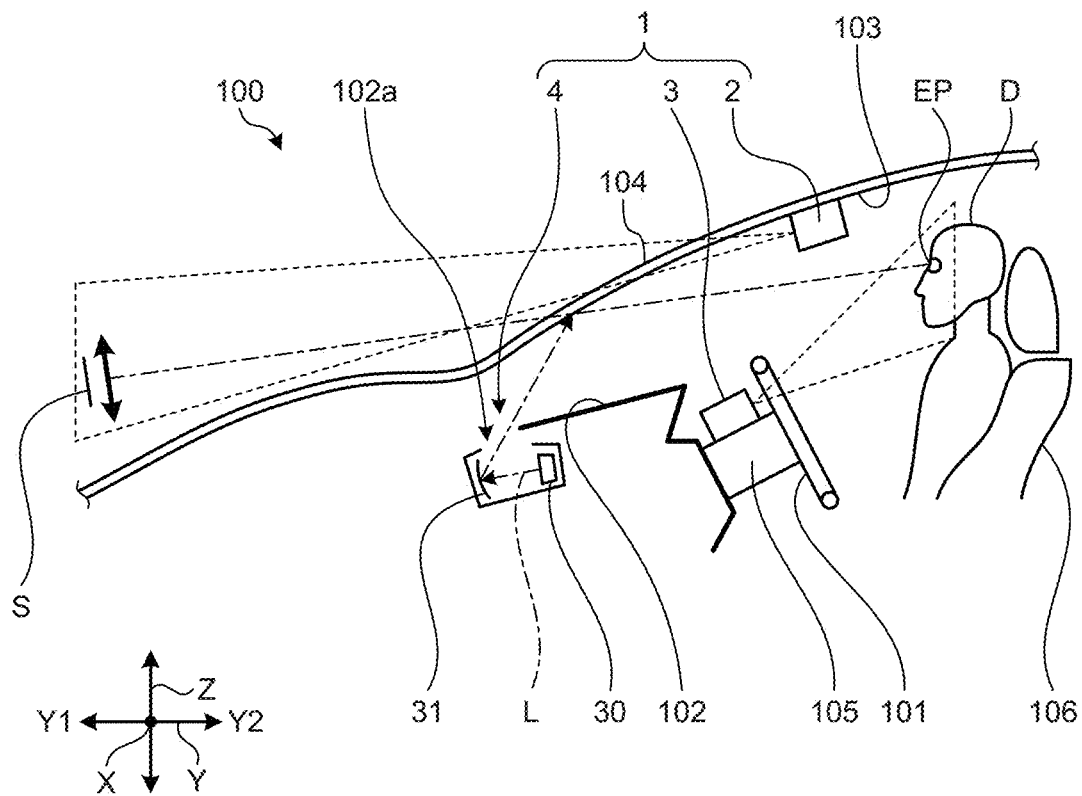
FIG. 1 is a diagram illustrating a schematic configuration of a vehicle on which a vehicle display device according to an embodiment is mounted.
Figure 2:
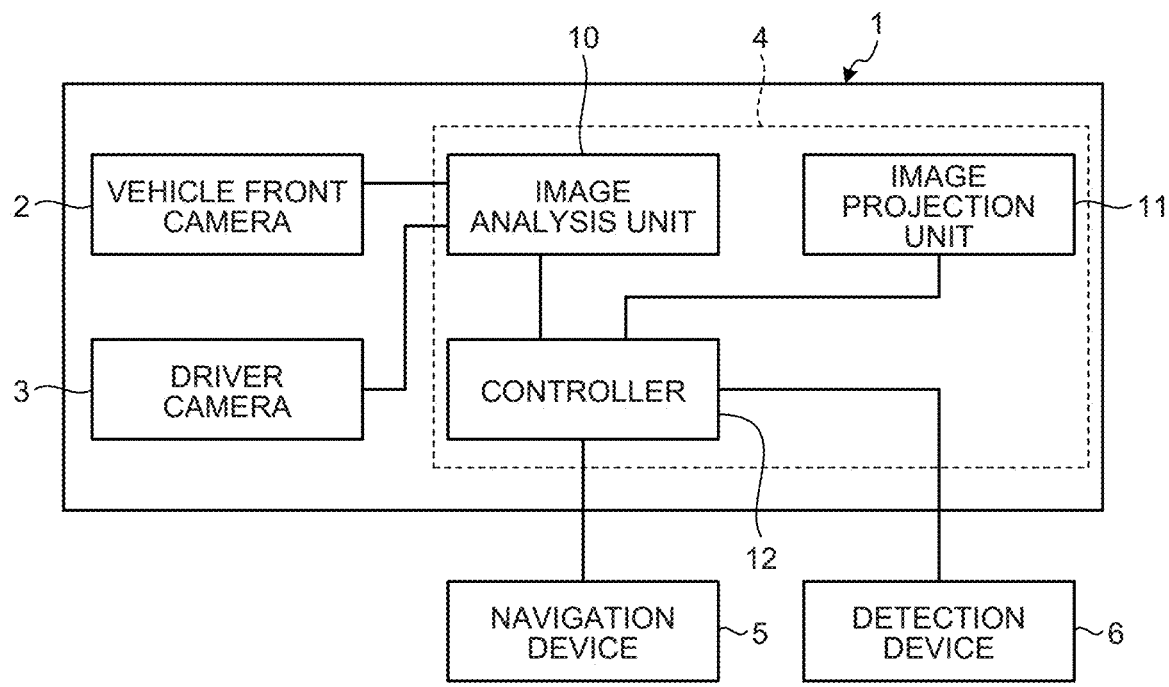
FIG. 2 is a block diagram illustrating a schematic configuration of the vehicle display device according to the embodiment.
Figure 3:
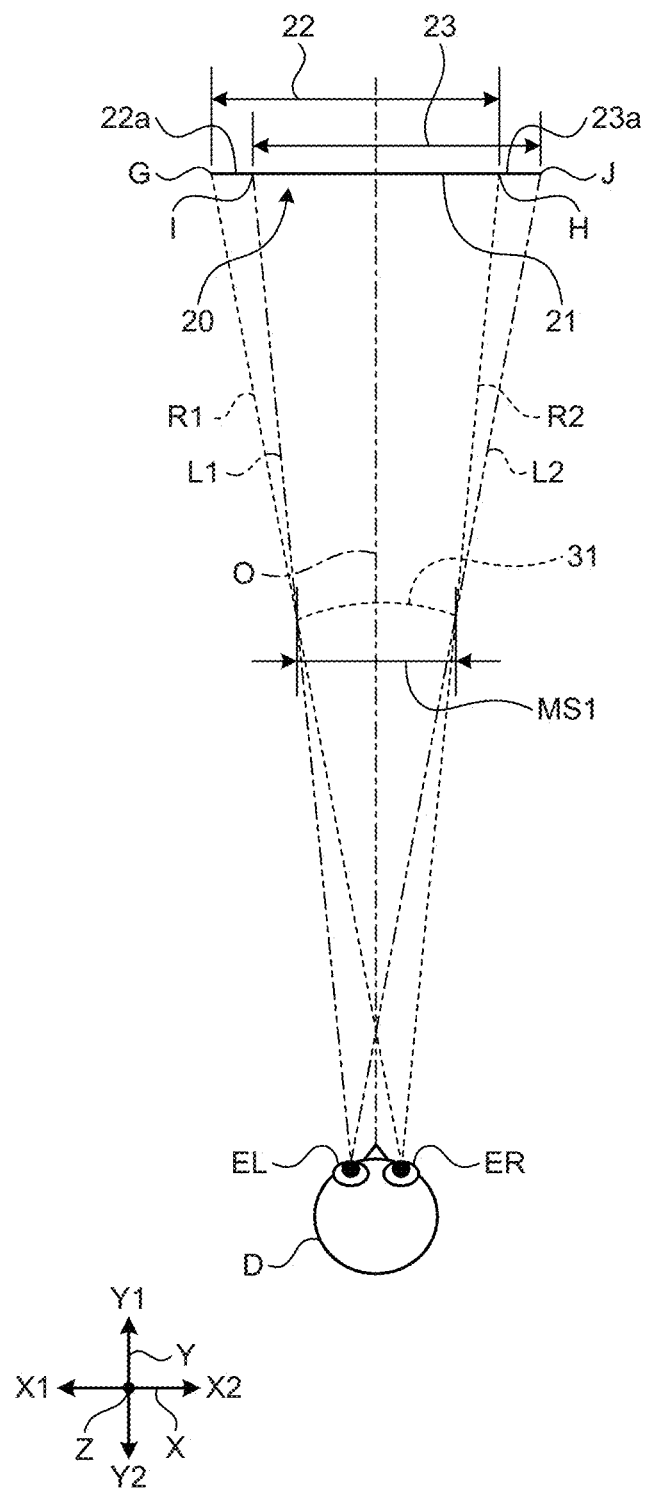
FIG. 3 is a diagram illustrating a positional relationship between an eye point and a virtual image display region in the embodiment.
Figure 4:
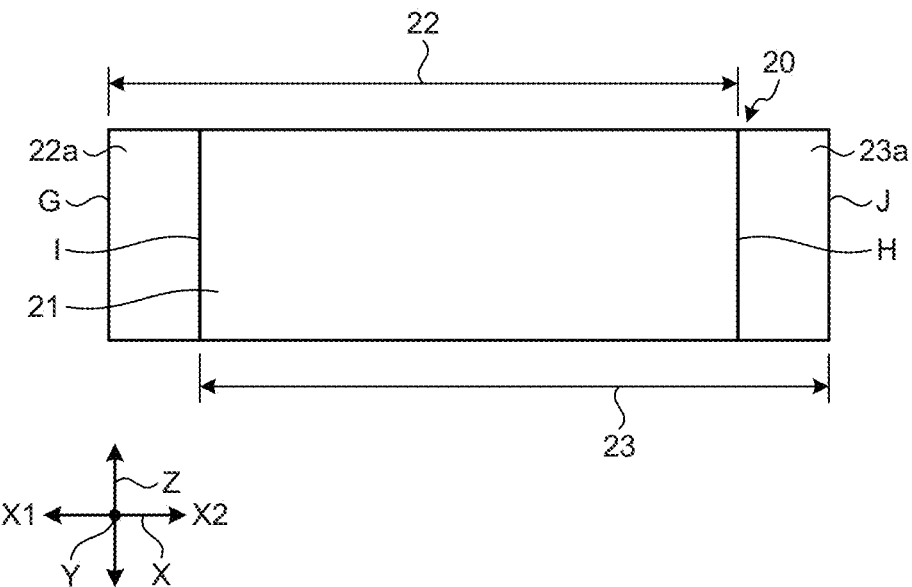
FIG. 4 is a diagram illustrating an example of a display region viewed from a traveling direction of the vehicle in the embodiment.
Figure 5:
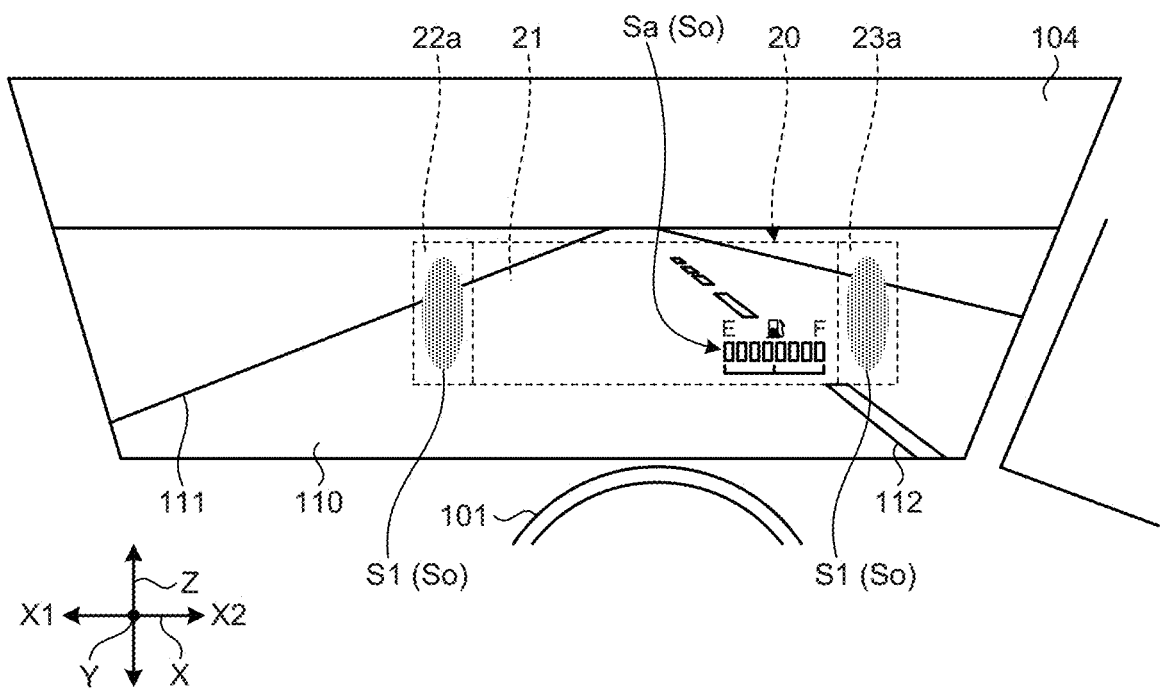
FIG. 5 is a diagram illustrating an example of a virtual image corresponding to a display image projected onto a windshield by the vehicle display device according to the embodiment.
Figure 6:
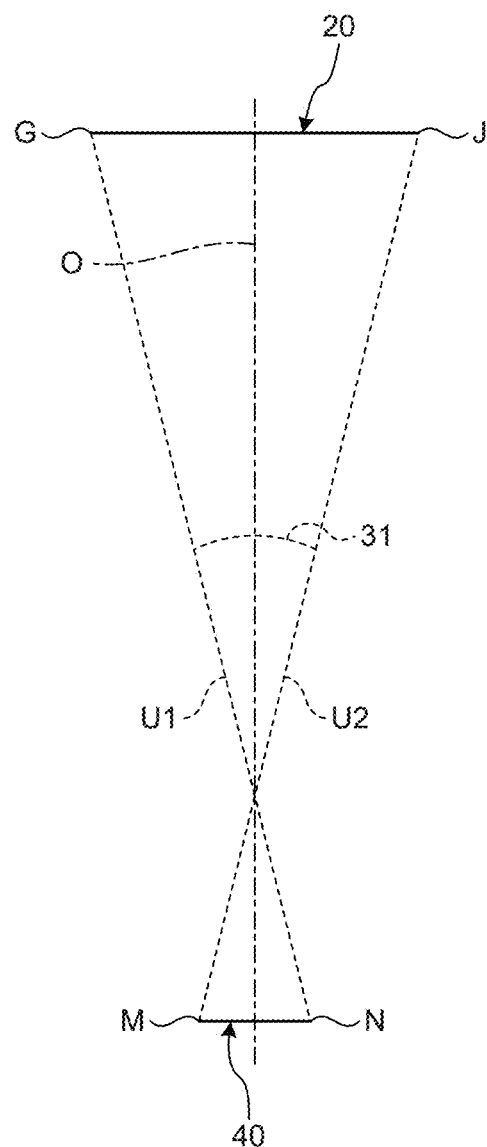
FIG. 6 is a diagram illustrating a positional relationship between a viewing range of a driver and the virtual image display region in the embodiment.
Figure 7:
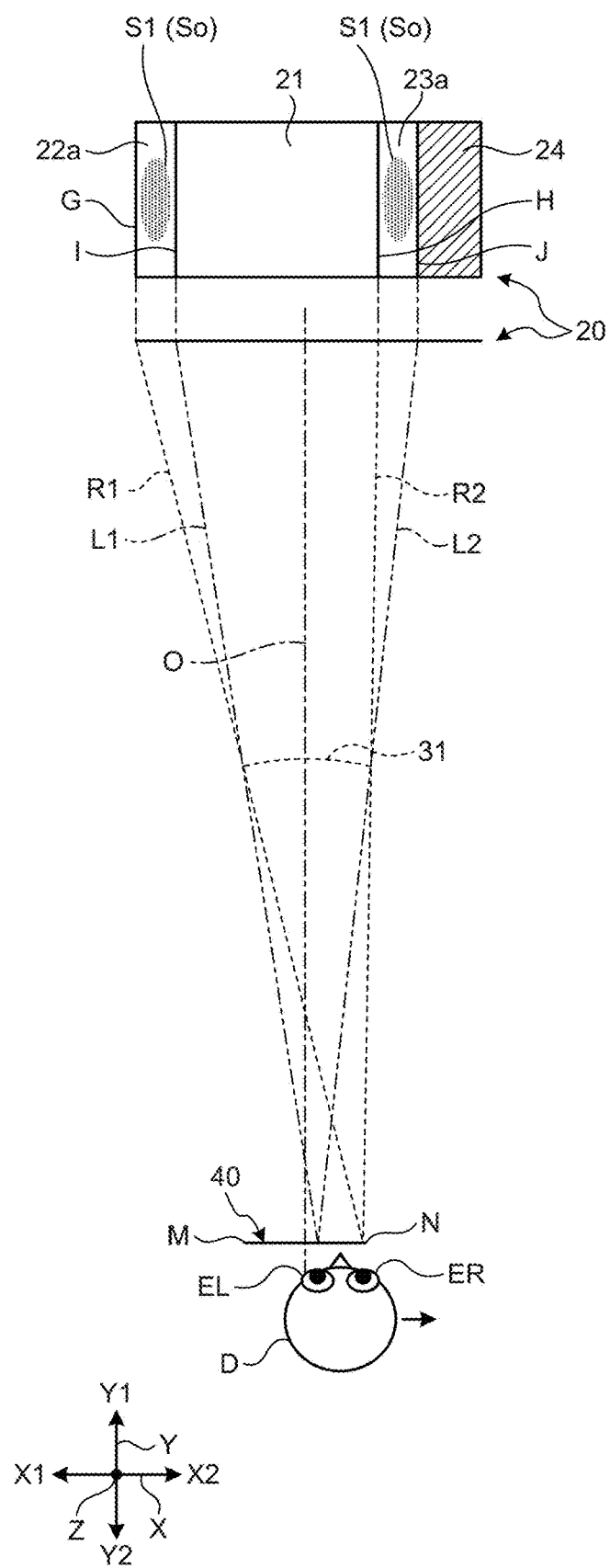
FIG. 7 is a diagram illustrating a change of a viewing region when the eye point is moved to the right in the embodiment.
Figure 8:
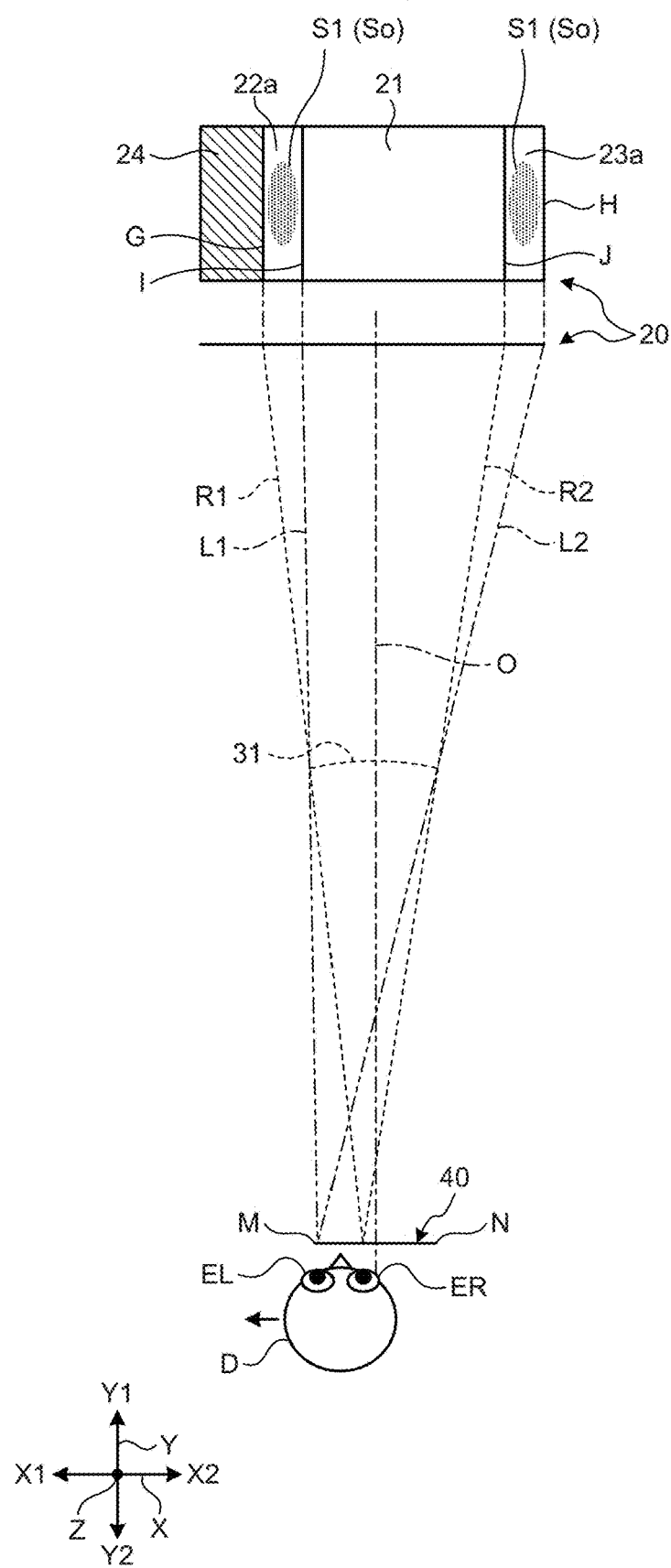
FIG. 8 is a diagram illustrating a change of the viewing region when the eye point is moved to the left in the embodiment.
Figure 9A:
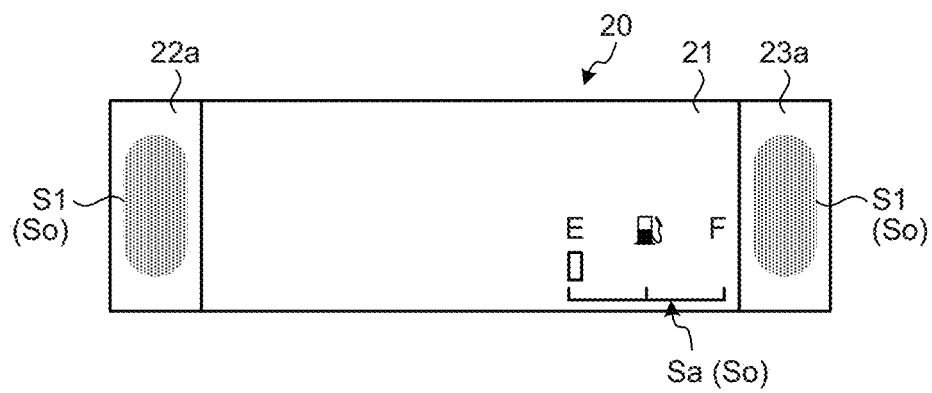
FIGS. 9A to 9C are diagrams each illustrating an example of a state change virtual image displayed in the virtual image display region.
Figure 9B:
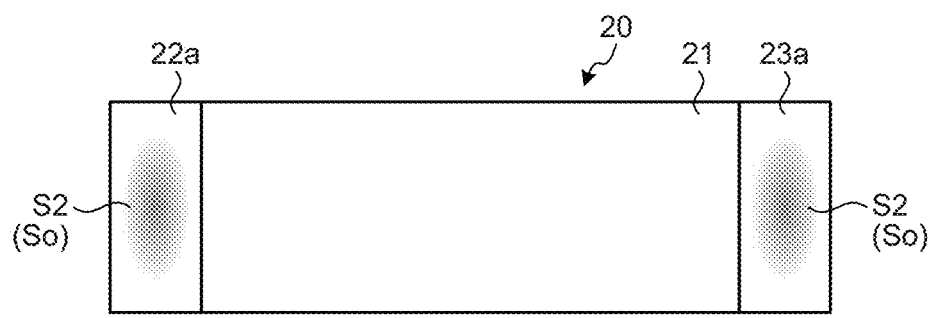
Figure 9C:
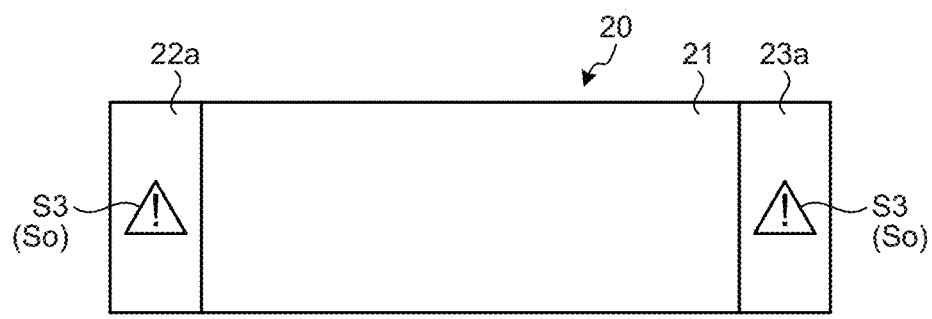

The vehicle display device according to the present embodiment will be described. FIG. 1 is a diagram illustrating a schematic configuration of a vehicle on which the vehicle display device according to the embodiment is mounted. FIG. 2 is a block diagram illustrating a schematic configuration of the vehicle display device according to the embodiment. FIG. 3 is a diagram illustrating a positional relationship between an eye point and a virtual image display region in the embodiment. FIG. 4 is a diagram illustrating an example of a display region viewed from a traveling direction of the vehicle in the embodiment. FIG. 5 is a diagram illustrating an example of a virtual image corresponding to a display image projected onto a windshield by the vehicle display device according to the embodiment. FIG. 6 is a diagram illustrating a positional relationship between a viewing range of a driver and the virtual image display region in the embodiment. FIG. 7 is a diagram illustrating a change of a viewing region when the eye point is moved to the right in the embodiment. FIG. 8 is a diagram illustrating a change of the viewing region when the eye point is moved to the left in the embodiment. FIGS. 9A to 9C are diagrams each illustrating an example of a state change virtual image displayed in the virtual image display region. Note that an optical axis O in FIGS. 3 and 6 to 8 is an optical axis of a reflection mirror 31 as described later.

Note that, in the following description, unless otherwise specified, an X direction illustrated in FIGS. 1, and 3 to 8 (including FIG. 12) is a width direction of a vehicle in the present embodiment and is a left-right direction. A Y direction is a front-rear direction of the vehicle in the present embodiment, and is a direction orthogonal to the width direction. A Z direction is a top-bottom direction of the vehicle in the present embodiment, and is a direction orthogonal to the width direction and the front-rear direction. The X, Y, and Z directions are orthogonal to one another. Note that, for convenience, in the X direction, an X1 direction indicates a left side and an X2 direction indicates a right side, and in the Y direction, a Y1 direction indicates a front side or a traveling direction of the vehicle and a Y2 direction indicates a rear side. The Z direction is, for example, a vertical direction of the vehicle.

A vehicle display device 1 according to the present embodiment is mounted on a vehicle 100 such as an automobile. The vehicle display device 1 illustrated in FIG. 1 projects a display image onto a windshield 104 in front of a driver D of the vehicle 100 to allow the driver D to view a virtual image S corresponding to the display image projected onto the windshield 104, the display image being displayed on a display 30. In (a passenger compartment of) the vehicle 100, a roof 103 is connected to an upper side of the windshield 104, and an instrument panel 102 is provided below the windshield 104. A steering wheel 101 rotatably supported by a steering column 105 is provided behind the instrument panel 102. The driver D is an occupant seated on a driver's seat 106 provided behind the steering wheel 101, and can view an area in front of the vehicle 100 through the windshield 104. The windshield 104 is an example of a projected member. The windshield 104 is semi-transparent and reflects display light L incident from the vehicle display device 1 toward an eye point EP of the driver D. The eye point EP is a viewpoint position of the driver D seated on the driver's seat 106. The driver D can view a display image projected onto the windshield 104 as the virtual image S present in front in a traveling direction of the vehicle 100, in a state of being seated on the driver's seat 106. The vehicle display device 1 in the present embodiment includes a vehicle front camera 2, a driver camera 3, and a device main body 4, and is connected to a navigation device 5 and a detection device 6 (FIGS. 1 and 2).

The navigation device 5 is a so-called car navigation system and provides map information, position information of an own vehicle, and information regarding the vehicle 100 that includes information indicating a surrounding road condition. For example, the navigation device 5 acquires a position of an own vehicle on the basis of information from a global positioning system (GPS) satellite (not illustrated), and acquires necessary information by using an intelligent transport system (ITS). Further, the navigation device 5 may be configured to acquire necessary information by using an advanced driver assistance system. Further, the navigation device 5 can, for example, read necessary information from an internal memory (not illustrated) and acquire necessary information from the outside by wireless communication. The navigation device 5 outputs the information regarding the vehicle 100 to the vehicle display device 1 in response to an acquisition request from the vehicle display device 1.

The detection device 6 is an example of a vehicle information acquisition unit. The detection device 6 includes various sensors that detect the state of the vehicle 100, and the like. For example, the detection device 6 outputs, as the information regarding the vehicle 100, a comparison result obtained by comparing detection values detected by various sensors or the like with threshold values, to the vehicle display device 1. Examples of a detection target of the detection device 6 include a brake system, a battery, a seat belt, an airbag system, a cooling water temperature, various oil pressures, a remaining fuel amount, an engine, incomplete door closing, a power steering, and the like. In addition, examples of another detection target of the detection device 6 include states of a washer fluid, an ABS/brake assist, a fuel filter, a tire pressure, an exhaust temperature, an automatic transmission (AT), a hybrid system, and the like. The detection device 6 may include not only various sensors and the like, but also a processor (not illustrated) such as an electronic control unit (ECU) that controls each unit in the vehicle 100.

The vehicle front camera 2 continuously captures an image of an actual scenery in front of the vehicle through the windshield 104, and acquires the captured image as a front image. The vehicle front camera 2 is arranged on the roof 103 or a rearview mirror (not illustrated) in a passenger compartment of the vehicle 100 (FIG. 1). The vehicle front camera 2 can, for example, capture a moving image of the actual scenery in front of the vehicle and acquire a still image obtained from the captured moving image as a front image. The vehicle front camera 2 is connected to the device main body 4 and sequentially outputs front images to the device main body 4. The vehicle front camera 2 may output the captured moving image to the device main body 4 as it is.

The driver camera 3 is disposed in the passenger compartment of the vehicle 100, continuously captures an image of the face of the driver D, and acquires the captured image as a driver image. The driver camera 3 is disposed, for example, on the upper side of the steering column 105 in the passenger compartment and behind the steering wheel 101 when viewed from the driver D. For example, the driver camera 3 can capture a moving image of the face of the driver D, and acquire a still image obtained from the captured moving image as a driver image. The driver camera 3 is connected to the device main body 4 and sequentially outputs driver images to the device main body 4. Note that the driver camera 3 may output the captured moving image to the device main body 4 as it is.

The device main body 4 projects a display image onto the windshield 104. The device main body 4 is disposed, for example, inside the instrument panel 102 of the vehicle 100 (FIG. 1). An opening 102a is provided in an upper surface of the instrument panel 102. The device main body 4 projects a display image by radiating the display light L toward the windshield 104 through the opening 102a. The device main body 4 in the present embodiment includes an image analysis unit 10, an image projection unit 11, and a controller 12 (FIG. 2). The image analysis unit 10 and the controller 12 are components that function on a microcontroller including, for example, a central processing unit (CPU), a memory, and various interfaces.

The image analysis unit 10 is connected to the vehicle front camera 2, the driver camera 3, and the controller 12, analyzes image signals input from the vehicle front camera 2 and the driver camera 3, and outputs analysis results to the controller 12. When the front image is input as an image signal from the vehicle front camera 2, the image analysis unit 10 specifies outside information to be notified to the driver D on the basis of the front image. The image analysis unit 10 outputs, as an analysis result and the information regarding the vehicle 100, the specified outside information to the controller 12. The outside information indicates a situation outside the vehicle 100, and includes, for example, surrounding vehicles, pedestrians, signal lights, signs, lanes, and the like in the actual scenery in front of the vehicle. The surrounding vehicles include preceding vehicles in front of the own vehicle, parked vehicles, parallel running vehicles (including light vehicles such as bicycles), and the like. The pedestrians include those who cross the road, those who walk on the road or sidewalk, and the like. The signal lights include traffic lights, railway signal lights, and the like. The signs include road signs. The lanes are legal lanes.

In a case where the driver image is input as an image signal from the driver camera 3, the image analysis unit 10 specifies a face orientation and a position of an eyeball (eye point EP) of the driver D by using a known image analysis method on the basis of the driver image. The image analysis unit 10 outputs, as an analysis result, information on the specified face orientation and eye point EP of the driver D to the controller 12.

The image projection unit 11 is an example of an image display unit. The image projection unit 11 is connected to the controller 12 and projects a display image input from the controller 12 onto the windshield 104. The image projection unit 11 includes a display 30 and the reflection mirror 31. The display 30 emits, as the display light L, a display image projected onto the windshield 104. The reflection mirror 31 is, for example, a concave mirror, and reflects, toward the windshield 104, the display light L emitted from the display 30.

The controller 12 is an example of a control unit. The controller 12 controls the vehicle front camera 2, the driver camera 3, the image analysis unit 10, and the image projection unit 11. The controller 12 is connected to each of the navigation device 5 and the detection device 6. The controller 12 controls the image projection unit 11 on the basis of the information regarding the vehicle 100 acquired from the navigation device 5, the detection device 6, and the image analysis unit 10 to perform a display image control for displaying the virtual image S at a predetermined position in a virtual image display region 20 in which the virtual image S can be displayed. The virtual image S is a virtual image So corresponding to the information regarding the vehicle 100. Further, the controller 12 controls the image projection unit 11 on the basis of the acquired information regarding the vehicle 100 and the information on the face orientation and eye point EP of the driver D acquired from the image analysis unit 10 to perform a display image control for displaying the virtual image So at a predetermined position in the virtual image display region 20.

Here, the virtual image display region 20 is a region in which the virtual image So can be displayed by the image projection unit 11 and through which the driver D can view the virtual image So. As illustrated in FIGS. 3 to 5, the virtual image display region 20 includes viewing regions including a binocular viewing region 21, a right monocular viewing region 22a, and a left monocular viewing region 23a. The binocular viewing region 21 is a portion where a right eye viewing region 22 and a left eye viewing region 23 overlap each other, and is a viewing region that is viewable with both eyes (right eye ER and left eye EL) of the driver D.

Figure 10:
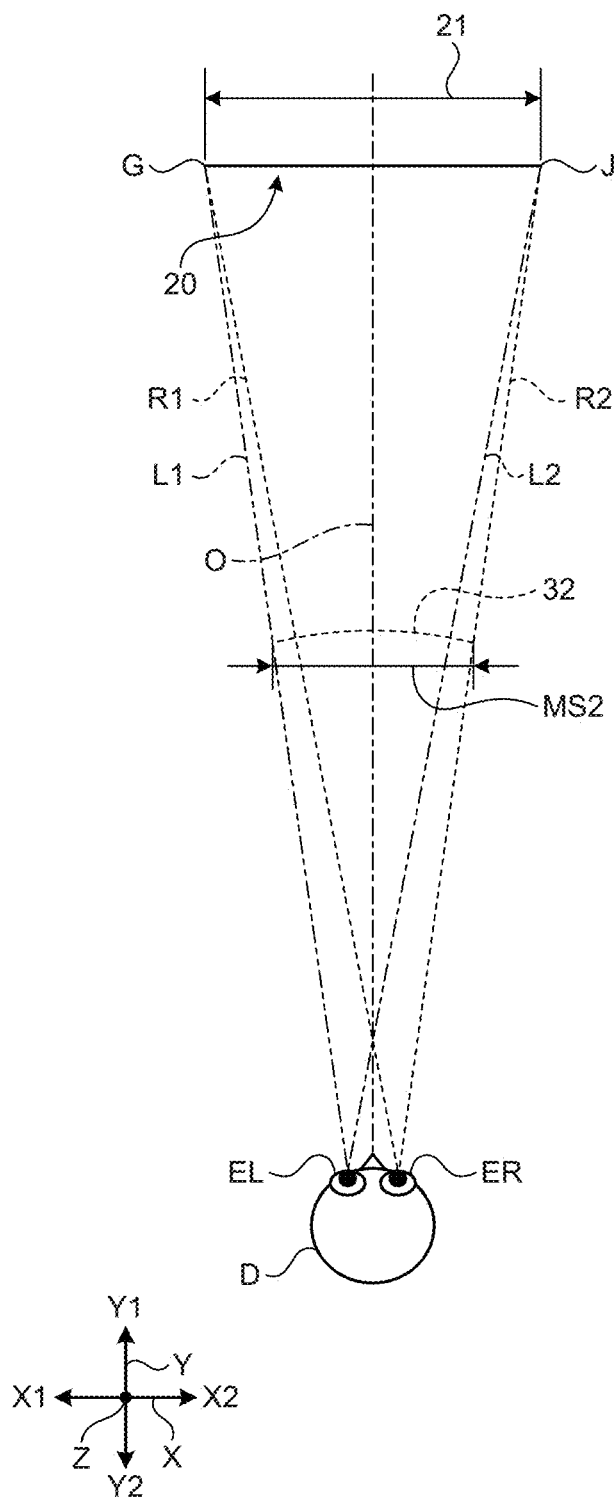
FIG. 10 is a diagram illustrating a positional relationship between an eye point and a virtual image display region in a vehicle display device in which only a binocular viewing region is configured.

In a case where the binocular viewing region 21, and the right monocular viewing region 22a and the left monocular viewing region 23a, which are one-eye viewing regions, are provided in the virtual image display region 20, a size of a reflection mirror 32 can be smaller than that of a vehicle display device in which only the binocular viewing region is configured as illustrated in FIG. 10. A length MS2 of a reflection mirror 32 illustrated in FIG. 10 in the width direction and a length MS1 of the reflection mirror 31 illustrated in FIG. 3 in the width direction satisfy a relationship of MS2>MS1. By reducing the size of the reflection mirror 32 as described above, it is possible to implement the device having a smaller size as compared with the vehicle display device in which only the binocular viewing region is configured. Further, in a case where the binocular viewing region and the one-eye viewing region are provided, the reflection mirror 32 can have a smaller size than that of the vehicle display device in which only the binocular viewing region is configured in the virtual image display region 20 having the same size. Therefore, the virtual image display region 20 can be enlarged by increasing the size of the reflection mirror 31.

The right eye viewing region 22 is a viewing region that is viewable with the right eye ER of the driver D. As illustrated in FIGS. 3 and 4, the right eye viewing region 22 occupies between G and H of the virtual image display region 20 in the left-right direction. The right monocular viewing region 22a is a portion of the right eye viewing region 22 excluding the left eye viewing region 23, the portion being adjacent to a left side of the binocular viewing region 21 in the virtual image display region 20. For example, in a case where the virtual image So is displayed in the right monocular viewing region 22a, the right monocular viewing region 22a is a region that is viewable with the right eye ER of the driver D, but is not viewable with the left eye EL. As illustrated in FIGS. 3 and 4, the right monocular viewing region 22a occupies between G and I of the virtual image display region 20 in the left-right direction.

The left eye viewing region 23 is a viewing region that is viewable with the left eye EL of the driver D. As illustrated in FIGS. 3 and 4, the left eye viewing region 23 occupies between I and J of the virtual image display region 20 in the left-right direction. The left monocular viewing region 23a is a portion of the left eye viewing region 23 excluding the right eye viewing region 22, the portion being adjacent to a right side of the binocular viewing region 21 in the virtual image display region 20. For example, in a case where the virtual image So is displayed in the left monocular viewing region 23a, the left monocular viewing region 23a is a region that is viewable with the left eye EL of the driver D, but is not viewable with the right eye ER. As illustrated in FIGS. 3 and 4, the left monocular viewing region 23a occupies between H and J of the virtual image display region 20 in the left-right direction.

G positioned at a left end of the virtual image display region 20 is positioned on an extension of a ray R1 connecting the right eye ER of the driver D and a left end of the reflection mirror 31. H positioned at a right end of the virtual image display region 20 is positioned on an extension of a ray L2 connecting the left eye EL of the driver D and a right end of the reflection mirror 31. I positioned at a left end of the binocular viewing region 21 is positioned on an extension of a ray L1 connecting the left eye EL of the driver D and the left end of the reflection mirror 31. J positioned at a right end of the binocular viewing region 21 is positioned on an extension of a ray R2 connecting the right eye ER of the driver D and the right end of the reflection mirror 31.

In a case where the acquired information regarding the vehicle 100 is state change information, the controller 12 of the present embodiment performs a display image control for a display image displayed by the image projection unit 11 so that a state change virtual image S1 corresponding to the state change information is displayed in the same display form in both of the left monocular viewing region 23a and the right monocular viewing region 22a at the same time (FIG. 5).

The information regarding the vehicle 100 includes, in addition to the above-described outside information, the state change information indicating a state change in the vehicle. The state change information relates to, for example, a remaining fuel amount warning in a case where the detection device 6 includes a fuel sensor. The state change information includes those similar to warnings of the vehicle 100. In a case where a resistance value detected by the fuel sensor is compared with a threshold value, and the resistance value is equal to or less than the threshold value, the detection device 6 outputs the state change information to the controller 12. When the state change information is input from the detection device 6, the controller 12 performs a display image control so that the state change virtual image S1 corresponding to the state change information in the same display form in a pair of left and right monocular viewing regions 23a and 22a at the same time. The state change virtual image S1 is included in the virtual image So corresponding to the information regarding the vehicle 100, and has, for example, a predetermined color, a predetermined shape, and a size (area) occupying a certain area in each of the left and right monocular viewing regions 23a and 22a. As illustrated in FIG. 9A, for example, the state change virtual image S1 is colored yellow, has an elliptical shape having a major axis in a vertical direction of each of the monocular viewing regions 23a and 22a, and has a size occupying an area of about ⅔ of each of the monocular viewing regions 23a and 22a.

Examples of those similar to the warnings of the vehicle 100 include a brake warning lamp for a brake system abnormality, a charging warning lamp for a battery abnormality, a non-fastened seatbelt warning lamp for a non-fastened seatbelt, and an airbag system warning lamp for an airbag system abnormality. In addition, the virtual image So corresponding to the information regarding the vehicle 100 can be a water temperature warning lamp for a cooling water temperature abnormality, an oil pressure warning lamp for an oil pressure abnormality, a remaining fuel amount warning lamp for a remaining fuel amount, an engine warning lamp for an engine abnormality, an incomplete door closing warning lamp for incomplete door closing, or a power steering warning lamp for a power steering abnormality. Further, the virtual image So can be a washer warning lamp corresponding to a washer abnormality, an ABS warning lamp/brake assist warning lamp for an ABS/brake assist abnormality, or a fuel filter warning lamp for a fuel filter abnormality. In addition, the virtual image So can be a tire pressure warning lamp for a tire pressure abnormality, an exhaust sound warning lamp for an exhaust temperature abnormality, an AT warning lamp for an AT abnormality, or a hybrid system abnormality warning lamp for a hybrid system abnormality.

The controller 12 changes a display position of the virtual image So in the virtual image display region 20 according to the change of the eye point EP of the driver D. The ranges of the binocular viewing region 21, the right monocular viewing region 22a, and the left monocular viewing region 23a in the virtual image display region 20 are changed according to the change of the eye point EP of the driver D. Therefore, the controller 12 changes a display position of the virtual image So in each of the binocular viewing region 21, the right monocular viewing region 22a, and the left monocular viewing region 23a according to the change of the eye point EP.

FIG. 6 illustrates a positional relationship between a viewing range 40 of the driver D that corresponds to the change of the eye point EP, the reflection mirror 31, and the virtual image display region 20. In FIG. 6, G positioned at the left end of the virtual image display region 20 is positioned on an extension of a straight line U1 connecting a right end N of the viewing range 40 and the left end of the reflection mirror 31. J positioned at the right end of the virtual image display region 20 is positioned on an extension of a straight line U2 connecting a left end M of the viewing range 40 and the right end of the reflection mirror 31. For example, when the eye point EP is moved toward the right end of the viewing range 40, as illustrated in FIG. 7, each of the binocular viewing region 21, the right monocular viewing region 22a, and the left monocular viewing region 23a are moved toward the left end of the virtual image display region 20 while being reduced in size in the left-right direction, and an unviewable region 24 is formed at the right end of the virtual image display region 20. Further, when the eye point EP is moved toward the left end of the viewing range 40, as illustrated in FIG. 8, each of the binocular viewing region 21, the right monocular viewing region 22a, and the left monocular viewing region 23a are moved toward the right end of the virtual image display region 20 while being reduced in size in the left-right direction, and the unviewable region 24 is formed at the left end of the virtual image display region 20. This unviewable region 24 is a region that is not viewable with the right eye ER, the left eye EL, or both eyes of the driver D. Even when the virtual image So is displayed in the unviewable region 24, the driver D cannot view the virtual image So.

Based on the above description, a case where the eye point EP of the driver D is changed from the center to the right end side and from the center to the left end side in the viewing range 40 in a state where the state change virtual image S1 is displayed in each of the left and right monocular viewing regions 23a and 22a will be described. As illustrated in FIG. 7, in a case where the eye point EP of the driver D is changed from the center to the right end side in the viewing range 40, each of the binocular viewing region 21, the right monocular viewing region 22a, and the left monocular viewing region 23a is moved toward the left end of the virtual image display region 20. The controller 12 moves the display position of the state change virtual image S1 toward the left end in accordance with the positions of the left monocular viewing region 23a and the right monocular viewing region 22a in the virtual image display region 20 after the left monocular viewing region 23a and the right monocular viewing region 22a are moved toward the left end. As illustrated in FIG. 8, in a case where the eye point EP of the driver D is changed from the center to the left end side in the viewing range 40, each of the binocular viewing region 21, the right monocular viewing region 22a, and the left monocular viewing region 23a is moved toward the right end of the virtual image display region 20. The controller 12 moves the display position of the state change virtual image S1 toward the right end in accordance with the positions of the left monocular viewing region 23a and the right monocular viewing region 22a in the virtual image display region 20 after the left monocular viewing region 23a and the right monocular viewing region 22a are moved toward the right end.

In the vehicle display device 1 described above, in a case where the acquired information regarding the vehicle 100 is state change information, the controller 12 performs a display image control for a display image displayed by the image projection unit 11 so that the state change virtual image S1 corresponding to the state change information is displayed in the same display form in both of the left monocular viewing region 23a and the right monocular viewing region 22a at the same time.

With the above-described configuration, for example, in a case where the virtual image is displayed only in the left monocular viewing region 23a, the driver D is made to recognize that something has happened on the left side of the vehicle 100, but it is possible to enable easy recognition of a fact that something has happened in the vehicle regardless of directivity, and warn the driver D regardless of directivity, by displaying the virtual image in the same display form in both of the left and right monocular viewing regions 23a and 22a at the same time. As a result, an efficient display can be performed by using the display region that is viewable with only one eye.

In the above-described embodiment, the controller 12 displays the state change virtual image S1 corresponding to the state change information in the same display form in both of the left monocular viewing region 23a and the right monocular viewing region 22a, but the present embodiment is not limited thereto. For example, the controller 12 may be a component which performs a display image control for a display image displayed by the image projection unit 11 so that a pre-state-change virtual image Sa corresponding to a pre-state-change information corresponding to a state before the state change in the vehicle is displayed in the binocular viewing region 21, and which hides the pre-state-change virtual image Sa when the state change information is acquired (FIG. 5). The pre-state-change information corresponding to the state before the state change in the vehicle indicates, for example, the remaining fuel amount of the vehicle 100. The remaining fuel amount of the vehicle 100 is detected by the fuel sensor which is the detection device 6. The pre-state-change virtual image Sa corresponding to the pre-state-change information is, for example, an icon of a fuel gauge indicating the remaining fuel amount. In the illustrated icon of the fuel gauge, for example, a plurality of blocks are arranged in the left-right direction between E and F, and the remaining fuel amount is indicated by the number of displayed blocks. As fuel runs low, the plurality of blocks are decreased from F to E.

For example, in a case where it is determined that the resistance value detected by the fuel sensor in the detection device 6 exceeds the threshold value, the controller 12 controls the image projection unit 11 on the basis of the pre-state-change information corresponding to the resistance value, and displays the pre-state-change virtual image Sa indicating the remaining fuel amount at a predetermined position in the binocular viewing region 21. On the other hand, in a case where it is determined that the resistance value detected by the fuel sensor is equal to or less than the threshold value, the controller 12 controls the image projection unit 11 on the basis of the state change information corresponding to the resistance value, and hides the pre-state-change virtual image Sa displayed in the binocular viewing region 21. For example, the pre-state-change virtual image Sa displayed in the binocular viewing region 21 is hidden.

The controller 12 performs a display image control for a display image displayed by the image projection unit 11 so that the state change virtual image S1 is displayed in a display form that provides a higher viewability when the driver D views the virtual image displayed in the left monocular viewing region 23a and the right monocular viewing region 22a with both eyes (EL and ER). In a case of displaying the state change virtual image S1 in each of the monocular viewing regions 23a and 22a, for example, the controller 12 displays the state change virtual image S1 in a display form that provides relatively high viewability as compared with the pre-state-change virtual image Sa displayed in the binocular viewing region 21. The display form with a higher viewability is, for example, a display form in which the state change virtual image S1 gives the driver D a relatively strong stimulation by changing the color, brightness, saturation, luminance, and the like.

In the vehicle display device 1 of the present embodiment, the controller 12 performs a display image control for a display image displayed by the image projection unit 11 so that the pre-state-change virtual image Sa corresponding to the pre-state-change information corresponding to a state before the state change in the vehicle is displayed in the binocular viewing region 21, and hides the pre-state-change virtual image Sa when the state change information is acquired. As a result, for example, the pre-state-change virtual image Sa displayed in the binocular viewing region 21 is hidden, such that the driver D easily recognizes that something has happened about the vehicle 100 corresponding to the pre-state-change virtual image Sa. For example, in a case where the icon of the fuel gauge is displayed as the pre-state-change virtual image Sa in the binocular viewing region 21, as the icon of the fuel gauge is hidden, it is possible to intuitively show a caution and warning about the remaining fuel amount of the vehicle 100 to the driver D.

Further, in the vehicle display device 1, the controller 12 performs a display image control for a display image displayed by the image projection unit 11 so that the state change virtual image S1 is displayed in a display form that provides a higher viewability when the driver D views the virtual image displayed in the left monocular viewing region 23a and the right monocular viewing region 22a with both eyes (EL and ER). As a result, the pre-state-change virtual image Sa displayed in the binocular viewing region 21 is hidden, and the state change virtual image S1 is displayed in each of the left and right monocular viewing regions 23a and 22a, and thus, the driver D can intuitively recognize that something has happened about the vehicle 100 corresponding to the pre-state-change virtual image Sa.

Note that, in the above-described embodiment, the state change virtual image S1 has a predetermined color, a predetermined shape, and a size (area) occupying a certain area in each of the left and right monocular viewing regions 23a and 22a, but the present embodiment is not limited thereto. For example, a state change virtual image S2 (So) illustrated in FIG. 9B, and a state change virtual image S3 (So) illustrated in FIG. 9C may be examples thereof. The state change virtual image S2 illustrated in FIG. 9B has a display form with a higher viewability, in which a so-called gradation is added to the state change virtual image S1 illustrated in FIG. 9A. The state change virtual image S3 illustrated in FIG. 9C is a so-called icon as a display form with a higher viewability.

Further, in the above-described embodiment, the controller 12 displays the state change virtual image S1 having a predetermined color, a predetermined shape, and a size (area) occupying a certain area in each of the left and right monocular viewing regions 23a and 22a, but the present embodiment is not limited thereto. For example, the controller 12 may change the display form of the state change virtual image S1 over time. The change of the display form over time means that, for example, the state change virtual image S1 illustrated in FIG. 9A is changed to the state change virtual image S2 illustrated in FIG. 9B with the passage of time, and then returns to the state change virtual image S1. For example, at least one of the color, shape, area, or the like of the state change virtual image S1 is changed with the passage of time. As a result, the viewability of the state change virtual image S1 displayed in the monocular viewing region (23a or 22a) can be further improved. Note that a target to be changed over time may be some or all of the color, shape, and area.

Further, in the above-described embodiment, the controller 12 performs a display image control for a display image displayed by the image projection unit 11 so that the state change virtual image S1 is displayed in a display form that provides a higher viewability when the driver D views the virtual image displayed in the left monocular viewing region 23a and the right monocular viewing region 22a with both eyes (EL and ER), but the present embodiment is not limited thereto. For example, the controller 12 may perform a display image control for a display image so that the state change virtual image S1 is displayed in a display form in which the amount of information indicated by the state change virtual image S1 is smaller than the amount of information indicated by the pre-state-change virtual image Sa displayed in the binocular viewing region 21. The amount of information in the present embodiment is, for example, the number of information that can be read from the virtual image S. A small amount of information means that the virtual image S has a single color, is composed of a straight line or a circle (ellipse), and the like. On the other hand, a large amount of information means that the virtual image S has multiple colors, is composed of a plurality of straight lines or a line including a plurality of bending points, or a polygon, and the like. The small amount of information may indicate that the virtual image S has a small difference in brightness or few uneven portions, or the virtual image S is composed of only numbers or only letters. The large amount of information may indicate that the virtual image S has a large difference in brightness or many uneven portions, or the virtual image S is composed of a combination of numbers and letters.

Further, in the above-described embodiment, the detection device 6 includes various sensors and the like that detect the states of the vehicle 100 on which the vehicle display device 1 is mounted, but the present embodiment is not limited thereto. The detection device 6 includes, as various sensors and the like, for example, at least one of various radars or sonars that use infrared rays, millimeter waves, ultrasonic waves, and the like to monitor the presence or absence of an external object around the vehicle 100, a vehicle speed sensor that detects the speed of the vehicle 100, an acceleration sensor that detects the acceleration acting in each direction on a body of the vehicle 100, a vehicle-to-vehicle communication device that performs communication with other vehicles around the vehicle 100, a road-to-vehicle communication device that performs communication between the vehicle 100 and a road machine arranged along a traveling route, a pedestrian-to-vehicle communication device that performs communication between the vehicle 100 and a terminal possessed by a pedestrian, or the like.

Further, in the above-described embodiment, the vehicle display device 1 may acquire the outside information indicating a situation outside the vehicle 100, and may be able to display the virtual image S corresponding to the acquired outside information so as to be superimposed on the actual scenery in front of the vehicle 100. As a specific example, the controller 12 can display, in the binocular viewing region 21, the virtual image S corresponding to the outside information so as to be superimposed on a pedestrian, a road, or the like in the actual scenery.

Further, in the above-described embodiment, the vehicle display device 1 projects a display image onto the windshield 104 of the vehicle 100, but the present embodiment is not limited thereto, and the display image may be projected onto, for example, a combiner or the like.

Further, in the above-described embodiment, the vehicle display device 1 is applied to the vehicle 100 such as an automobile, but the present embodiment is not limited thereto, and the vehicle display device 1 may be applied to, for example, a vessel or an aircraft other than the vehicle 100.

The vehicle display device according to the present embodiment has an effect that a display region that is viewable with only one eye can be efficiently utilized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   an image display unit that projects a display image onto a projected member of a vehicle and displays a virtual image corresponding to the display image projected onto the projected member in a virtual image display region in which the virtual image is displayable to allow a driver of the vehicle to view the virtual image;
   a vehicle information acquisition unit that acquires information regarding the vehicle; and
   a controller that is configured to cause the image display unit to display a vehicle information virtual image corresponding to the information regarding the vehicle, wherein
   the virtual image display region includes viewing regions including:
   a binocular viewing region that is a portion where a right eye viewing region viewable with a right eye of the driver and a left eye viewing region viewable with a left eye of the driver overlap each other, and that is viewable with both eyes of the driver;
   a right monocular viewing region that is adjacent to a left side of the binocular viewing region and is a portion of the right eye viewing region excluding the left eye viewing region; and
   a left monocular viewing region that is adjacent to a right side of the binocular viewing region and is a portion of the left eye viewing region excluding the right eye viewing region,
   the information regarding the vehicle includes state change information indicating a state change in the vehicle, and
   in a case where the acquired information regarding the vehicle is the state change information, the controller performs a display image control for the display image displayed by the image display unit so that a state change virtual image corresponding to the state change information is displayed in the same display form in both of the left monocular viewing region and the right monocular viewing region at the same time.

2. The vehicle display device according to claim 1, wherein
   the controller changes a display form of the state change virtual image over time.

3. The vehicle display device according to claim 2, wherein
   the controller performs a display image control for the display image displayed by the image display unit so that a pre-state-change virtual image corresponding to pre-state-change information corresponding to a state before the state change in the vehicle is displayed in the binocular viewing region,
   the controller hides the pre-state-change virtual image when the state change information is acquired, and
   the controller performs a display image control for the display image displayed by the image display unit so that the state change virtual image is displayed in a display form that provides a higher viewability when the driver views a virtual image displayed in the right monocular viewing region and the left monocular viewing region with both eyes.

4. The vehicle display device according to claim 1, wherein
   the controller performs a display image control for the display image displayed by the image display unit so that a pre-state-change virtual image corresponding to pre-state-change information corresponding to a state before the state change in the vehicle is displayed in the binocular viewing region,
   the controller hides the pre-state-change virtual image when the state change information is acquired, and
   the controller performs a display image control for the display image displayed by the image display unit so that the state change virtual image is displayed in a display form that provides a higher viewability when the driver views a virtual image displayed in the right monocular viewing region and the left monocular viewing region with both eyes.

* * * * *